A. C. DREW.
JOURNAL BEARING.
APPLICATION FILED MAY 6, 1916.
1,223,482.
Patented Apr. 24, 1917.
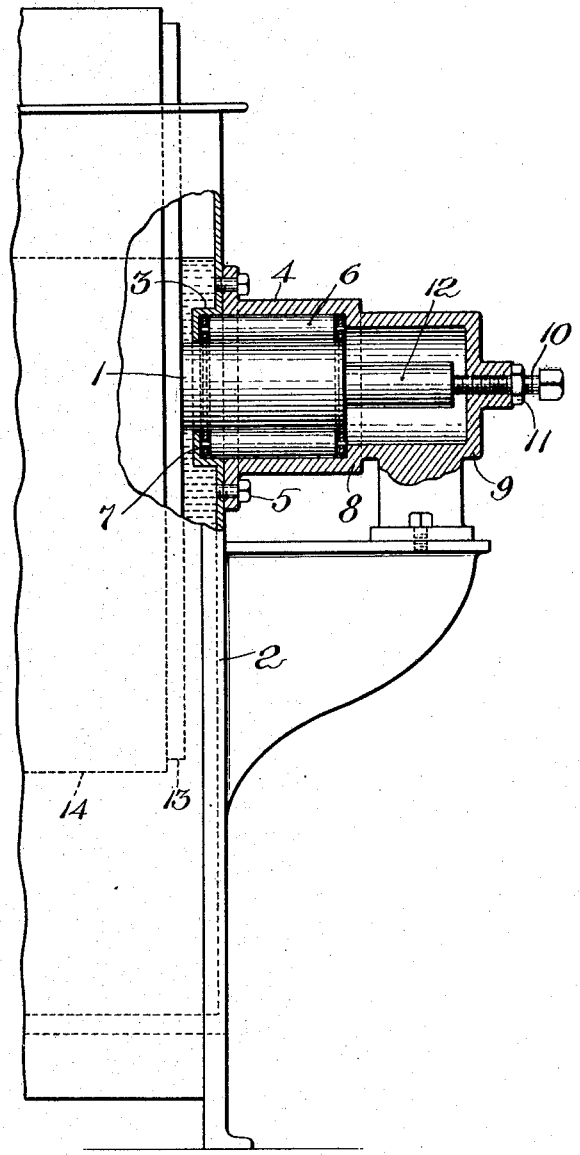
Inventor:
Arthur C. Drew,
by [signature]
Attorneys.

UNITED STATES PATENT OFFICE.

ARTHUR C. DREW, OF NEW BEDFORD, MASSACHUSETTS.

JOURNAL-BEARING.

1,223,482.　　　　Specification of Letters Patent.　　Patented Apr. 24, 1917.

Application filed May 6, 1916. Serial No. 95,961.

*To all whom it may concern:*

Be it known that I, ARTHUR C. DREW, a citizen of the United States, and resident of New Bedford, in the county of Bristol and State of Massachusetts, have invented new and useful Improvements in Journal-Bearings, of which the following is a specification.

This invention relates to a journal bearing, and more particularly it relates to a journal bearing for a machine adapted to contain a fluid whereby the journal and bearing surfaces may be housed in a fluid-tight compartment in communication with the fluid casing of the machine.

In machines such as paper-making machines, etc., where it is necessary to operate a shaft in a fluid compartment, it has heretofore been common to employ a journal bearing mounted exteriorly of the fluid compartment of the machine and to provide a fluid-tight gland in the wall of the fluid compartment, whereby the bearing surfaces operate in a separate and distinct housing not in communication with the fluid compartment of the machine. Such an arrangement is objectionable for several reasons. The maintenance of a fluid-tight gland is both difficult and costly. The fluid-tight gland must be maintained in accurate alinement with the journal bearing mounted exteriorly of the machine casing. In paper-making machines, for example, large cylinders or molds are rotated in the fluid compartment by means of the paper felt which has comparatively small tensile strength, and it becomes highly desirable not only to reduce the friction in the journal bearings of the roller, but it is equally essential to maintain substantially equal friction at the two ends of each cylinder or mold and to maintain equal friction at the various bearings of a train of cylinders or molds, so that the paper felt may not be subjected to varying tensions as it passes through the machine. With bearings of the type above mentioned and other known types, it has been practically impossible to maintain a low, constant friction in the journal bearings of a machine.

The principal object of this invention is to provide a journal bearing which may be built in the wall of a fluid compartment in such a manner as to maintain a fluid-tight covering for the opening through which the journal projects, and to permit the bearing surfaces to be in a housing in communication with the fluid compartment of the machine. Thus the bearing surfaces may operate in the fluid contained in the machine, and owing to the fact that the journal housing is tightly secured to the casing and wholly surrounds the end of the shaft, the necessity of packing glands is eliminated and the journal bearing may be maintained fluid-tight indefinitely.

Other objects attained by my invention will be apparent from the following description and the accompanying drawing in which, The figure is a vertical longitudinal cross-section of the journal bearing, shaft and machine casing, showing a portion of the machine in elevation.

In the particular embodiment of my invention illustrated in the drawing, the shaft 1 is mounted to rotate within the machine casing 2, which may be adapted to contain a fluid such as water. The casing 2 is provided with a cylindrical member 3 projecting inwardly from the casing and surrounding and concentric with the shaft 1. A housing 4 is secured to the outside of casing 2 by means of bolts 5 or other suitable fastening means. The member 3 and the housing 4 have interior cylindrical bearing surfaces adapted to coöperate with bearing rollers 6 of ordinary construction. The interior member 3 is provided with an inturned flange 7 and the housing 4 has an offset portion 8 arranged to limit the endwise movement of bearing rollers 6. The reduced portion 9 of the housing 4 has a threaded opening in the end thereof to receive a screw 10 which is held in a fixed position by means of a lock-nut 11, and which may be adjusted longitudinally to limit the endwise movement of the shaft 1 which may, if desired, have an end portion 12 of reduced diameter. The cylinder or mold 13 secured to the shaft 1 is adapted to be driven by the felt 14 passing over the top of the cylinder or mold within the casing 2.

It will be noted that in the illustrated embodiment of my invention the housing 4 completely surrounds the end of the shaft projecting through the fluid-casing 2, and that it may be tightly secured to the casing to maintain a fluid-tight compartment within the journal bearing. Owing to the fact that the interior of the journal bearing is in communication with the interior of the casing 2, it is unnecessary to employ lubricating means for the bearing when the machine casing contains a fluid which may serve as a lubricant.

The shaft 1 may or may not be reduced at its end, as shown at 12, but in either event it has free longitudinal movement, except as limited by the adjusting screw 10. Owing to the fact that a portion of the bearing surface is inside the casing, namely, the inner surface of the cylindrical portion 3 of the casing, the middle of the distributed pressure between the shaft and the bearing is more nearly in line with the plane of the casing. Thus the turning moment of the force exerted by the shaft on the housing 4 is reduced, and the tendency for the housing to be loosened from the casing above the shaft is correspondingly reduced. Owing to the fact that the clearance between the roller 6 and the annular member 3 is very small, as the housing tends to spring outwardly the inner ends of those rollers above the shaft engage the annular surface 3, and a portion of the turning moment acts directly on the casing through the surface 3, thus further reducing the turning moment acting to loosen the housing from the casing above the shaft.

Thus, by my invention, a simple and efficient journal bearing is provided which has been found to be particularly useful in paper-making machines where it is desirable to maintain a low and constant friction and at the same time to have a bearing which obviates the use of packing glands, and which may be maintained fluid-tight without difficulty.

I claim:

1. A journal bearing comprising a casing having an opening to receive the journal, said casing having an annular bearing surface inside thereof, a housing secured to the outside of said casing having an internal bearing surface, and bearing rollers engaging said bearing surfaces.

2. A journal bearing comprising a casing having an opening therein to receive a journal, a bearing having an annular bearing surface inside said casing, a housing secured to the outside of said casing having an internal bearing surface in alinement with the said annular bearing surface, said surfaces forming a bearing concentric with said journal.

3. A journal bearing comprising a casing having an opening therein to receive a journal, an interior flange on said casing at least partially surrounding said opening, and a housing secured to said casing and surrounding the portion of said journal projecting through said casing, said flange and said casing having internal bearing surfaces.

4. A journal bearing comprising a casing having a circular opening to receive the journal, a member projecting inwardly from said casing, a housing projecting outwardly from said casing, said casing, member and housing having internal bearing surfaces in alinement, bearing rollers engaging said surfaces and the journal, and means on said member and said housing to limit endwise movement of said roller bearing.

5. A journal bearing comprising a supporting casing having an opening to receive a shaft, a housing tightly secured to one side of said casing and having an interior bearing surface, said casing having an annular bearing surface on the other side thereof, and bearing rollers between the shaft and said surfaces, whereby a portion of the load is carried by said annular bearing surface thus reducing the turning moment tending to loosen said housing from said casing.

6. The combination with a machine casing adapted to contain a fluid, a shaft within said casing and projecting outwardly therethrough, a member integral with and projecting inwardly from said casing, a housing tightly secured to the outside of said casing and surrounding the end of said shaft, said member and said housing having internal bearing surfaces, bearing rollers positioned between said surfaces and said shaft, and an internal flange on said member and an offset portion on said housing to limit endwise movement of said roller bearing.

7. The combination with a machine casing adapted to contain a fluid, a shaft within said casing and projecting outwardly therethrough, a housing tightly secured to said casing and surrounding the end of said shaft, a member having a bearing surface within said housing arranged to allow free longitudinal movement of said shaft, and means within said casing for adjustably varying the longitudinal movement of said shaft, whereby said adjusting means and said bearing surface is housed in a fluid-tight compartment communicating with the interior of said casing.

8. The combination with a machine casing adapted to contain a fluid, a shaft within said casing and projecting outwardly through an opening therein, an annular flange projecting inwardly from said opening, a housing surrounding the end of the shaft and tightly secured to the outside of said casing, bearing rollers engaging the interior surfaces of said flange and said housing, and adjustable means within said housing to limit endwise movement of the shaft, whereby the adjustable means and the bearing surfaces are housed in a fluid-tight compartment communicating with the interior of said casing.

9. The combination with a machine casing adapted to contain a fluid, a shaft within said casing and projecting outwardly therethrough, a journal-bearing for said shaft a portion of which is within said casing and a portion of which is without said casing surrounding the end of said shaft, and bearing rollers between said shaft and said journal-bearing.

Signed by me at New Bedford, Mass., this 29th day of April, 1916.

ARTHUR C. DREW.